United States Patent Office 3,188,543
Patented June 8, 1965

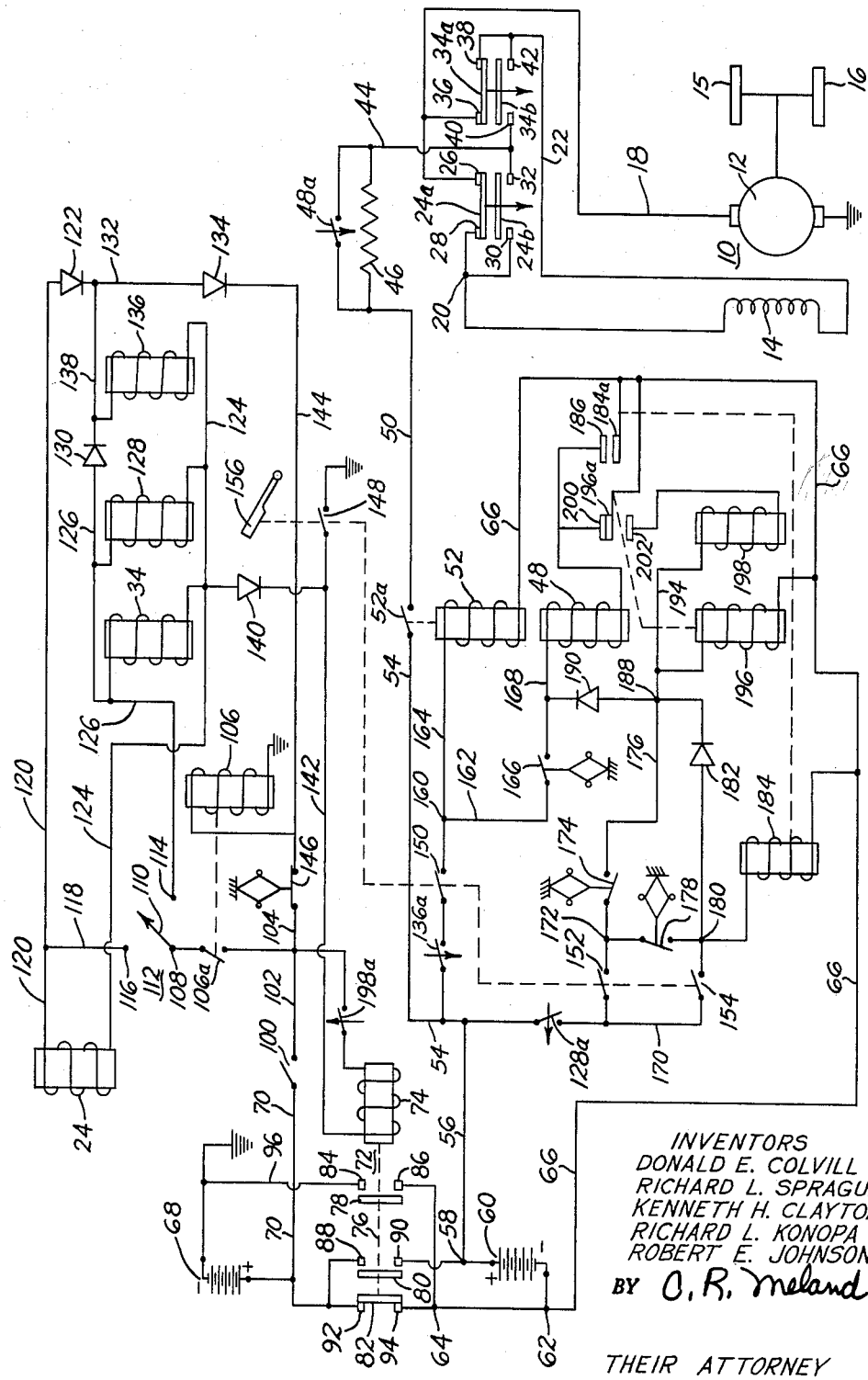

3,188,543
BATTERY OPERATED ELECTRIC MOTOR CONTROL FOR VEHICLE
Donald E. Colvill, Richard L. Sprague, Kenneth H. Clayton, Richard L. Konopa, and Robert E. Johnson, all of Anderson, Ind., assignors to General Motors Corporation, Detroit, Mich., a corporation of Delaware
Filed Dec. 29, 1960, Ser. No. 79,355
4 Claims. (Cl. 318—139)

This invention relates to control systems for controlling the speed of an electric motor that drives a vehicle.

One of the objects of this invention is to provide a control system for an electric motor-driven vehicle wherein the motor is fed from batteries and wherein switching means are provided for connecting the batteries in series or in parallel with the motor and for connecting the batteries with the motor through a resistor and further wherein means have provided for insuring that the voltage applied to the motor as determined by the connections of the batteries and resistor is increased in steps when increasing the speed of the motor to thereby minimize sudden high current drains on the batteries and also to thereby provide a smooth acceleration.

Another object of this invention is to provide a motor control system wherein the motor is fed from batteries and wherein switching means are provided for connecting the batteries in series or in parallel with the motor and with a resistor to vary the voltage applied to the motor, and further wherein centrifugal switch means is provided that is driven by the motor and which operates to insure that the voltage applied to the motor will be increased only in step-wise fashion when it is desired to accelerate the motor.

A further object of this invention is to provide a control system for the motor of an electric motor-driven vehicle that is operative to provide forward and reverse movement of the vehicle and wherein means are provided for preventing suddenly shifting from a forward to a reverse movement and vice versa when the vehicle is in motion.

Further objects and advantages of the present invention will be apparent from the following description, reference being had to the accompanying drawing wherein the preferred embodiment of the present invention is clearly shown.

In the drawings:

The single figure drawing is a schematic electrical circuit diagram of a motor control system made in accordance with this invention.

Referring now to the drawing, the reference numeral 10 generally designates a series type D.C. motor which has an armature 12 and a field winding 14. The armature 12 is mechanically connected with the wheels 15 and 16 of the vehicle that is to be driven by the motor 12. One side of the motor armature 12 is connected directly to ground as is apparent from the drawing, while the opposite side of the armature 12 is connected with a lead wire 18. The field winding 14 of the motor is connected with the junction 20 and with the lead wire 22.

The direction of rotation of the motor 10 is controlled by a pair of electromagnetic switches. One of these switches comprises the coil winding 24 and the contactors 24a and 24b which are shifted when the coil winding 24 is energized. When the coil winding 24 is not energized, the contactor 24a shorts the contacts 26 and 28 while the contactor 24b is maintained out of engagement with contacts 30 and 32. When coil winding 24 is energized, the contactor 24a shifts out of engagement with contacts 26 and 28 and the contactor 24b shorts the fixed contacts 30 and 32.

The other electromagnetic switch includes the coil winding 34 which controls the shifting of contactors 34a and 34b. It can be seen that when the coil winding 34 is deenergized, the contactor 34a connects contacts 36 and 38; and when the coil winding 34 is energized, the contactor 34b connects the fixed contacts 40 and 42.

The contacts 38 and 42 are connected with lead wire 22 whereas the contacts 26 and 36 are connected with lead wire 18. The contacts 28 and 30 are connected with junction 20 and are therefore connected to one side of the field winding 14. The fixed contacts 32 and 40 are connected with a lead wire 44.

The lead wire 44 is connected to one side of a power resistor 46 which is adapted to control the amount of voltage applied to the motor 10. The power resistor 46 is at times short circuited by a contactor 48a which is a normally open contact but which is closed whenever the relay coil 48 is energized. The resistor 46 and the contactor 48a are connected with a lead wire 50 and it is seen that this lead wire 50 is connected to one side of a relay operated contactor 52a. The contactor 52a is a normally open contact but will be pulled to a position to connect lead wires 50 and 54 whenever the coil winding 52 is energized. It is pointed out that the arrow through the contactor 48a indicates that this is a normally open contactor but will be pulled to a closed position whenever the relay coil 48 is energized.

The lead wire 54 is connected with a lead wire 56, and it is seen that this lead wire is connected with the junction 58. The junction 58 is connected to one side of a battery 60 which may be, for example, a 12 volt battery. The opposite side of the battery 60 is connected with junction 62, and it is seen that this junction is connected with junction 64 and the lead wire 66. The power supply system for the motor includes another battery 68 which also may be a 12 volt battery. It is seen that one side of the battery 68 is connected directly to ground whereas an opposite side of this battery is connected with the lead wire 70.

The batteries 60 and 68 can be connected in series or in parallel with the motor 10 by a magnetic switch which is generally designated by reference numeral 72. This magnetic switch includes the coil winding 74 which operates a plunger 76. The plunger 76 carries the contactors 78, 80, and 82. When the coil winding 74 is not energized, the contactor 78 is out of engagement with fixed contacts 84 and 86 and the contactor 80 is out of engagement with fixed contacts 88 and 90. The contactor 82 connects fixed contacts 92 and 94 when the coil winding is deenergized. When coil winding 74 is energized, it can be seen that contactor 82 will be shifted out of engagement with fixed contacts 92 and 94 and that contactors 78 and 80 will connect respectively fixed contacts 84 and 86 and fixed contacts 88 and 90.

It is seen that the fixed contact 84 is connected to ground via lead wire 96. The contact 86 is connected with junction 64. The contact 90 is connected with junction 58 whereas the contact 88 is connected with lead wire 70 and is therefore connected to one side of the battery 68. The contact 92 is connected to one side of battery 68 and the contact 94 is connected with the junction 64.

It is pointed out that when the coil winding 74 is not energized, the batteries are connected in series between ground and the junction 58 so that 24 volts is applied between junction 58 and ground. On the other hand, when the coil winding 74 is energized, the batteries 60 and 68 are connected in parallel so that there is only 12 volts appearing between junction 58 and ground.

The lead wire 70 which is connected with the positive terminal of battery 68 is connected to one side of a manually operable key switch designated by reference numeral 100. The opposite side of this key switch is connected with lead wire 102 which is in turn connected with junction 104. The junction 104 is connected to one side of a normally open relay contactor 106a which is pulled to a closed position whenever the relay coil 106 is energized. The opposite side of the relay-operated contactor 106a is connected with junction 108.

The junction 108 is connected with the shiftable contactor 110 of a manually operable switch generally designated by reference numeral 112. This switch 112 has fixed contacts 114 and 116. As will become more readily apparent hereafter, when the contactor 110 is shifted into engagement with fixed contact 116, the motor 10 is operated to provide for reverse movement of the vehicle. On the other hand, when the contactor 110 is shifted into engagement with the fixed contact 114, the vehicle will move in a forward direction. When contactor 110 is out of engagement with fixed contacts 114 and 116, the vehicle will be at rest and will not move in either direction.

The fixed contact 116 is connected with a lead wire 118, and this lead wire connects with the lead wire 120. The lead wire 120 is connected between a diode 122 and the relay coil winding 24. The opposite side of relay coil winding 24 is connected with the lead wire 124.

The fixed contact 114 is connected with the lead wire 126. The lead wire 126 is connected to one side of relay coil winding 34 and to one side of a relay coil winding 128. The coil winding 128 controls the contactor 128a which is a normally open contact. When coil winding 128 is energized, the contactor 128a is pulled to a closed position. It is seen that the relay coil winding 128 is connected directly across lead wires 124 and 126. The coil winding 34 is likewise connected directly across the lead wires 124 and 126.

Lead wire 126 connects to one side of diode 130. The opposite side of diode 130 is connected to diode 134 by lead wires 138 and 132. A relay coil winding 136 is connected between lead wires 138 and 124. The coil winding 136 controls the operation of contactor 136a which is a normally open contact but which is shifted to a closed position whenever the relay coil 136 is energized. A diode 140 is connected between lead wire 124 and lead wire 142. The lead wire 142 connects to one side of relay coil winding 74. The diode 134 is connected between lead wire 132 and the lead wire 144. A centrifugal switch including contactor 146 is connected between junction 104 and the lead wire 144. This contactor 146 normally connects the junction 104 and the lead wire 144, but will be shifted to an open position when the speed of the motor 10 reaches some predetermined value. The centrifugal switch is mechanically coupled to the motor or to the motor drive system for the wheels in order to operate as described.

The control system of this invention includes switches 148, 150, 152, and 154, all of which are operated by an accelerator pedal 156. The switches are so connected with the accelerator pedal 156 that initial depression of the accelerator pedal will close the switch 148. A further depression of the accelerator pedal will then close switch 150 and still further depression will close the switch 152. When the accelerator pedal has been shifted a sufficient distance to close the switch 152, the switches 148 and 150 are maintained closed. If the accelerator pedal is still further depressed, the switch 154 will be closed. The switch 154, as will become more readily apparent hereinafter, is an override switch and the accelerator pedal 156 may therefore be connected with some detent or spring means which provides a "feel" before the switch 154 can be closed.

The switch 148 is connected between lead wire 142 and ground. The switch 150 is connected between the relay operated switch 136a and the junction 160. The junction 160 is connected with lead wires 162 and 164, the lead wire 164 being connected to one side of relay coil winding 52. The lead wire 162 is connected to one side of a centrifugal switch that includes the shiftable contactor 166. This centrifugal switch is driven by the motor 10 and will connect the lead wires 162 and 168 whenever the motor attains some predetermined speed. The speed at which the contactor 166 shifts to a closed position may be roughly the same as the speed that the contactor 146 shifts to an open position.

The accelerator-operated switch 152 is connected between lead wire 170 and the junction 172. The junction 172 is connected to one side of a centrifugal switch that includes the centrifugally operated contactor 174. The opposite side of this switch is conected with lead wire 176. The centrifugal switch that includes the contactor 174 is driven by the motor 10 or by the drive system for the wheels 15 and 16 and will be shifted to a closed position at a speed higher than that required to shift the contactor 166 to a closed position.

The junction 172 is connected to still another centrifugal switch including the centrifugally operated contactor 178. The opposite side of this centrifugal switch is connected with the junction 180. The centrifugal switch that includes the contactor 178 is driven by the motor 10 or the system that it drives and will be shifted to a closed position at a speed that is still higher than the speed required to cause a closure of the switch that includes contactor 174. It thus is seen that as the motor 10 is accelerated, the contactor 166 will be first shifted to a closed position, then the contactor 174 and then the contactor 178.

The junction 180 is connected to one side of the accelerator-operated switch 154 and is also connected to one side of a diode 182 and to one side of a relay coil winding 184. The relay coil 184 controls the shifting of a shiftable contact 184a which cooperates with a fixed contact 186. When the relay coil 184 is energized, the contact 184a is shifted into engagement with the fixed contact 186. It is seen that the diode 182 is connected between junction 180 and the junction 188. A diode 190 is connected between junction 188 and the lead wire 168.

The junction 188 is connected with lead wire 194 which is in turn connected to one side of relay coil windings 196 and 198. The opposite side of relay coil winding 196 is connected with lead wire 66. The relay coil winding 196 controls the shiftable movement of a contactor 196a which cooperates with fixed contacts 200 and 202. When relay coil 196 is not energized, the contact 196a engages the fixed contact 200. When relay coil 196 is energized, the contact 196a leaves the contact 200 and shifts into engagement with fixed contact 202. It is seen that the relay coil 198 is connected between fixed contact 202 and the lead wire 194. The relay coil 198 operates the normally closed contactor 198a which is connected between the relay coil winding 74 and the junction 104. When the relay coil winding 198 is energized, the contactor 198a will be shifted to an open position.

In the operation of the system that has just been described, if assumed that the driver of the electrically driven vehicle desires to move in a forward direction, the contactor 110 of switch 112 is shifted into engagement with the fixed contact 114. Upon closing of the key switch 100, the relay coil 106 will be energized from lead wire 70 to cause a closure of the contactor 106a. If the accelerator pedal 156 is now slightly depressed in order to cause a closure of the switch 148, it is seen that the relay coils 34, 128, and 136 will all be energized from lead wire 126 through the coils and thence through the closed switch 148 to ground. With relay coil 34 energized, it is seen that the contactors 34a and 34b are shifted so that the contacts 40 and 42 will be connected to complete a circuit between lead wire 44 and one side of the field winding 14. The circuit will be complete to the motor armature 12 through the contactor 24a and the lead wire 18. The energization of relay coil 34 by the shifting of contactor 110 therefore places the motor in condition for driving the vehicle in a forward direction.

The energization of the relay coil 128 closes the contactor 128a and the energization of the relay coil 136 through diode 130 causes the closure of the contactor 136a.

Since at this time the relay coil 198 is not energized, the contactor 198a will be in a closed position so that the relay coil 74 is energized via a circuit that may be traced from junction 104 through the contactor 198a through relay coil 74, through lead wire 142 and through the assumed closed contactor 148 to ground. With relay coil 74 energized, it is apparent that the magnetic switch 72 will be shifted so that the batteries 60 and 68 are connected in parallel to provide 12 volts between junction 58 and ground.

If the operator of the vehicle now depresses the accelerator 156 a sufficient distance to close the switch 150, it can be seen that the relay coil 52 will be energized from the lead wire 56 via contactor 136a, switch 150, lead wire 164, relay coil 52, lead wire 66, and thence to the junction 62. With relay coil 52 energized, the contactor 52a is shifted to a closed position so that 12 volts will now be applied between the lead wire 50 and ground. This 12 volts is, of course, applied to the motor 10 through the resistor 46 since the contactor 48a is now in an open position. The motor will now accelerate with a voltage that is equal to 12 volts less the voltage drop across resistor 46 and, as the motor speed increases, the time will come when the speed has reached a sufficient value to cause the centrifugal switch contactor 166 to shift to a closed position. When contactor 166 shifts to a closed position, it can be seen that the relay coil 48 will be energized from the lead wire 162 through the engaged contacts 200 and 196a. With relay coil 48 energized, the contactor 48a is shifted to a closed position so that the power resistor 46 is now short circuited and a full 12 volts is now applied to the motor 10. This will increase the speed of the motor to a value determined by the 12 volt energization and the attained speed will be sufficient to cause the centrifugal switch contactor 174 to be shifted to a closed position. The operator of the vehicle may now operate indefinitely at 12 volts by simply maintaining the accelerator pedal operated switch 150 in a closed position and the vehicle will operate at some predetermined speed.

It is pointed out that in getting to the 12 volt mode of operation, the shift from a lower voltage, for example 6 volts, to 12 volts was not and could not be made until the centrifugal switch contactor 166 was shifted to a closed position.

Since the centrifugal switch 174 is now in a closed position due to the previous 12 volt energization of the motor, it can be seen that with the closure of accelerator-operated switch 152, the relay coil winding 196 will be energized. With relay coil winding 196 energized, the contact 196a is shifted out of engagement with fixed contact 200 and is shifted into engagement with the fixed contact 202. It is seen that this switching will immediately deenergize the coil winding 48 to cause the contactor 48a to shift to an open position and therefore insert the resistor back in the circuit between the batteries and the motor. At the same time, the engagement of contact 196a with fixed contact 202 will complete a circuit for the relay coil winding 198 to cause the contactor 198a to shift to an open position. When contactor 198a shifts to an open position, it is seen that the relay coil 74 will be deenergized and the contactors 78 and 80 will therefore be shifted out of engagement with their respective fixed contacts while the contactor 82 will be shifted into engagement with fixed contacts 92 and 94. This will cause the batteries 68 and 60 to be connected in series to provide 24 volts between the junction 58 and ground. Approximately 6 volts will be dropped in the resistor 46 so that the motor now will accelerate with 18 volts applied thereto.

As the motor accelerates with 18 volts applied thereto, the time will come when the speed of the motor will be sufficient to cause contactor 178 to move to a closed position. When contactor 178 moves to a closed position, it can be seen that the relay coil 184 will be energized. With relay coil 184 energized, the contactor 184a is shifted into engagement with a fixed contact 186. When the contacts 184a and 186 are shifted into engagement with each other, it can be seen that the coil winding 48 will be energized. With coil winding 48 energized, the contactor 48a is shifted to a closed position to once more short circuit the voltage dropping resistor 46 and therefore cause a full 24 volts to be applied to the motor 10. The motor may now be operated indefinitely at the 24 volt mode of energization as long as the accelerator pedal is depressed sufficiently to maintain the switches 148, 150, and 152 in a closed position.

It is noted that in going from the 12 volt mode of energization to the 24 volt mode of energization, the motor is accelerated by first applying approximately 18 volts thereto and then applying 24 volts thereto. The shift from 18 volts to 24 volts can only occur after the centrifugal switch 178 moves to a closed position and there therefore is provided a smooth acceleration for the motor and no sudden current drain on the batteries.

The accelerator operated switch 154 is adapted to provide for rapid acceleration of the motor 10 in the case of emergencies. If the accelerator pedal 156 is depressed to the point where the switch 154 is closed, it can be seen that the relay coil 184 will be immediately energized. With relay coil 184 energized, the contacts 184a and 186 become engaged to provide an energization path for the relay coil 48 via diodes 182 and 190 and the lead wire 168. The energization of relay coil 48 causes the closure of contact 48a to bypass the power resistor 46. At the same time that relay coil 184 is energized, the relay coil 196 will be energized to cause contacts 196a and 202 to become engaged. This causes an immediate energization of relay coil 198 to cause the contactor 198a to be shifted to an open position and therefore, deenergize relay coil 74. With relay coil 74 deenergized, the batteries are immediately connected in series combination to the motor 10 to apply a full 24 volts thereto around the power resistor 46. It thus is seen that any time the accelerator-operated switch 154 is closed, an immediate 24 volts is applied to the motor for causing an emergency rapid acceleration of the same.

If the selector switch 112 is shifted such that the movable contactor 110 engages the reverse contact 116, the vehicle will move in a reverse direction since the current through the field 14 of the motor will be reversed. When contactor 110 engages the fixed contact 116, it is seen tht the relay coil 24 will be energized via lead wire 120, diode 140 and through the switch 148 to ground. It is now impossible to energize relay coil 34 since the contactor 110 has been shifted off the contact 114. With relay coil 24 energized, the contactor 24a is shifted out of engagement with contacts 26 and 28 and the contactor 24b is shifted into engagement with fixed contacts 30 and 32. The circuit for energizing the motor is now lead wire 44, through contactor 24b, through the field winding 14, through lead wire 22, through contactor 34a, through lead wire 18 and thence through the motor armature to ground. It is seen that the current flow has been reversed through the field of the motor to cause a reverse rotation of the motor. With the current flow reversed through the field winding 14 of the motor, the motor will operate in a reverse direction.

It is important to note that in the reverse position where the contactor 110 engages the fixed contact 116, it is impossible to energize either relay coil 34 or relay coil 128. The diode 130 prevents such energization whereas the diode 122 will permit the energization of relay coil 136. Since relay coil 128 cannot be energized, contactor 128a remains in an open position while the contactor 136a moves to a closed position. When contactor 136a moves to a closed position, it is possible to move the accelerator 156 to a position wherein switch 150 is closed and therefore applies 6 volts to the motor. After the motor speed closes centrifugal switch contactor 166, the motor will be energized with 12 volts while moving the vehicle in a reverse direction. Since switch 128a cannot be closed, the motor will never be accelerated in a reverse direction with more than 12 volts applied thereto. This is true since the relay coil 198 cannot be energized due to the open contact 128a and therefore the contactor 198a cannot be opened to cause the series connection of batteries 60 and 68.

The control system for the motor 10 is provided with means for preventing the motor from being reversed in its direction of rotation when the motor is moving the vehicle in one direction at a certain speed. As an example of this, assume that the contactor 110 is in engagement with fixed contact 114 to provide for forward movement of the vehicle. It is seen that the initial energization of the relay coil 106 will be through the centrifugal switch contactor 146. This, of course, causes contactor 106a to close and therefore apply voltage to the shiftable contactor 110. As the speed of the vehicle increases, the centrifugal switch 146 will open, but this will not cause a deenergization of relay coil 106. The relay coil will be energized via a circuit that includes lead wire 126, diode 130, diode 134, and lead wire 144. It thus is seen that the initial opening of the centrifugal switch contactor 146 will not effect operation of the control circuit as long as the vehicle is moving in a forward direction and the vehicle may be accelerated to a speed that results from a full 24 volts energization. If the operator of the vehicle should for some reason now suddenly shift the contactor 110 from the fixed contact 114 to the fixed contact 116, the direction of rotation of the motor 10 will not be immediately reversed so as to cause damage to the motor and to the parts connecting the motor and the wheels 15 and 16. When the fixed contactor 110 leaves the fixed contact 114, the holding circuit for the relay coil 106 is immediately broken so that the contactor 106a now moves to an open position. The relay coil 106 cannot now be energized through the centrifugal switch contactor 146 since the vehicle is traveling at a speed that has caused this contactor 146 to open. With contactor 106a in an open position, there can be no voltage applied to the relay coil 24 to cause the contactors 24a and 24b to shift, and since the relay coil 34 is deenergized when contact 110 leaves contact 114, there is no voltage at all applied to the motor 12 and it will coast to a stop.

If it is assumed that the vehicle was first started out in a reverse direction by shifting the contactor 110 into engagement with the fixed contact 116, the relay coil 106 will be energized through the centrifugal switch contactor 146 to cause a closure of contact 106a. If the motor is now accelerated in a reverse direction to provide reverse movement of the vehicle, the centrifugal switch contactor 146 will open at some predetermined speed. The relay coil 106 nevertheless remains energized via a circuit that may be traced from junction 104, through contactor 106a, through switch contactor 110, through lead wire 118, through lead wire 120, through diodes 122 and 134, and thence through lead wire 144, to the relay coil 106. If the contactor 110 is now shifted to the forward contact 114 as the vehicle is moving in a reverse direction, the relay coil 106 is once more immediately deenergized as soon as the contactor 110 leaves the fixed contact 116. This opens the contactor 106a so that when the contactor 110 reaches the contact 114, it cannot attempt to energize the motor for forward rotation.

It can be seen from the foregoing that the system of this invention prevents suddenly attempting to reverse direction of rotation of the drive motor 10 when the drive motor is operating in one direction and is moving the vehicle in a predetermined direction.

While the embodiments of the present invention as herein disclosed, constitute a preferred form, it is to be understood that other forms might be adopted.

What is claimed is as follows:

1. A motor control system for an electric motor driven vehicle comprising, an electric motor, a plurality of storage batteries, a power resistor, first switch means normally connecting said batteries in series and operable when shifted to connect said batteries in parallel, a first coil winding for controlling the operation of said first switch means, said first coil winding operating said switch means to shift said batteries to a parallel connection when energized, second switch means connected across said power resistor, a second coil winding for closing said second switch means when energized to thereby short circuit said resistor, means connecting said resistor between said batteries and said motor, a first manually operable switch, means for causing said first coil winding to be energized when said first manually operable switch is closed, means for causing said second coil winding to be energized in response to the motor attaining a predetermined speed to thereby short circuit said power resistor, a second manually operable switch, means for causing said first coil winding to be deenergized to connect said batteries in series and for causing said second coil winding to be deenergized to open the short circuit around said power resistor when said second manually operable switch is closed, means responsive to the speed of said motor for causing said second coil winding to be energized to short circuit said resistor when said motor attains a second higher speed, and third manually operable switch means for controlling the connection of said motor with said batteries to control its direction of rotation.

2. In a motor control system for an electric motor driven vehicle comprising, an electric motor having an armature and a field winding, a source of voltage, first magnetic switch means including switch contacts and a first coil winding, second magnetic switch means including second switch contacts and a second coil winding, circuit means connecting said voltage source with said motor through said first and second magnetic switch means, said first and second magnetic switch means controlling the direction of current flow through the field winding of said motor to control its direction of rotation, an energizing circuit for said first and second coil windings including a two-position switch having a shiftable contactor and fixed contacts connected respectively with said first and second coil windings, third switch means connected between said voltage source and said shiftable contactor, said third switch means being pulled to a closed position by a third coil winding, a first holding circuit for said third coil winding including said shiftable contactor, a second holding circuit for said third coil winding including said shiftable contactor, and centrifugal switch means controlling the connection of said third coil winding with said voltage source, said centrifugal switch means being driven by said motor and opening at a predetermined motor speed.

3. A motor control system for an electric motor driven vehicle comprising, an electric motor, a source of voltage, means for controlling the connection of said motor with said voltage source to control its direction of rotation, said last named means being controlled by first and second coil windings, a two-position manually operable switch including a shiftable contactor and fixed contacts connected respectively with said first and second coil windings, third switch means connected between said voltage source and said shiftable contactor and controlled by a third coil winding, a first holding circuit for said third coil winding including said shiftable contactor, a second holding circuit for said third coil winding including said shiftable contactor, and centrifugal switch means operated by said motor connected between said third coil winding and said voltage source.

4. A motor control system for an electric motor driven vehicle comprising, first and second batteries, an electric motor, a resistor, a first electromagnetic switch including a first coil winding and first contacts, said first contacts being connected across said resistor and being closed only when said first coil winding is energized, a second electromagnetic switch including second contacts and a second coil winding, said second contacts connecting said batteries in parallel when said second coil winding is energized and operative to connect said batteries in series when said second coil winding is deenergized, first and second manually operable switch means operated by a common manually operable actuator and closable in a predetermined sequence, first and second centrifugal switch means driven by said electric motor and closable at different predetermined speeds, a third electromagnetic switch including a third coil winding and third contacts, said third contacts connecting said batteries with said motor through said resistor or through said first contacts depending upon whether said first contacts are opened or closed, a control circuit for said third coil winding including said first manually operable switch means, a control circuit for controlling the energization of said second coil winding including said second manually operable switch means and said second centrifugal switch means, and a control circuit for controlling the energization of said first coil winding including said first manually operable switch and said first centrifugal switch means.

References Cited by the Examiner

UNITED STATES PATENTS

| 1,110,821 | 9/14 | Radley | 318—139 |
| 2,246,803 | 6/41 | Lee | 318—325 X |
| 3,134,063 | 5/64 | Hastings | 318—139 |

FOREIGN PATENTS 641,746  8/50  Great Britain.

ORIS L. RADER, *Primary Examiner.*

MILTON O. HIRSHFIELD, *Examiner.*